(12) United States Patent
Jones, Jr. et al.

(10) Patent No.: US 7,131,272 B2
(45) Date of Patent: Nov. 7, 2006

(54) REDUCED CARBON DIOXIDE EMISSION SYSTEM AND METHOD FOR PROVIDING POWER FOR REFRIGERANT COMPRESSION AND ELECTRICAL POWER FOR A LIGHT HYDROCARBON GAS LIQUEFACTION PROCESS USING COOLED AIR INJECTION TO THE TURBINES

(75) Inventors: Richard Jones, Jr., Katy, TX (US); Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 127 days.

(21) Appl. No.: 10/674,212

(22) Filed: Sep. 29, 2003

(65) Prior Publication Data

US 2004/0134196 A1 Jul. 15, 2004

Related U.S. Application Data

(60) Provisional application No. 60/414,806, filed on Sep. 30, 2002.

(51) Int. Cl.
*F01K 1/00* (2006.01)
(52) U.S. Cl. ..................... 60/670; 60/39.182
(58) Field of Classification Search .......... 60/670, 60/39, 182
See application file for complete search history.

(56) References Cited

U.S. PATENT DOCUMENTS

| | | | |
|---|---|---|---|
| 4,199,961 A * | 4/1980 | Carter et al. | 62/535 |
| 4,566,885 A | 1/1986 | Haak | |
| 4,755,200 A | 7/1988 | Liu et al. | |
| 5,139,548 A | 8/1992 | Liu et al. | |
| 5,295,350 A | 3/1994 | Child et al. | |
| 5,457,951 A * | 10/1995 | Johnson et al. | 60/780 |
| 5,689,141 A | 11/1997 | Kikkawa et al. | |
| 6,050,083 A * | 4/2000 | Meckler | 60/39.182 |
| 6,248,794 B1 | 6/2001 | Gieskes | |
| 6,272,882 B1 | 8/2001 | Hodges et al. | |
| 6,318,065 B1 | 11/2001 | Pierson | |
| 6,324,867 B1 | 12/2001 | Fanning et al. | |
| 6,446,465 B1 | 9/2002 | Dubar | |
| 6,651,443 B1 * | 11/2003 | Meckler | 60/783 |

FOREIGN PATENT DOCUMENTS

| | | |
|---|---|---|
| AU | 9658151 | 11/1996 |
| DE | 19517116 | 6/1996 |
| WO | 9733131 | 9/1997 |
| WO | 9836038 | 8/1998 |
| WO | 0140725 | 6/2001 |

OTHER PUBLICATIONS

"A Novel Concept" by H. Bauer *Hydrocarbon Engineering* May 2002 pp. 59-63.
General Electric Corporation—Gas Turbines.
PCT Search Reports—PCT/US03/30556 and PCT/03/30555.
Jones, Jr., et al., U.S. Appl. No. 10/674,022, filed Sep. 29, 2003.
Khakoo et al., "The next generation of LNG plants", pp. 1-14.*
Murtaza Khakoo, Beatrice Fischer and Jean-Christophe Raillard, "The Next Generation of LNG Plants," LNG 13 Conference, May 14, -17, 2001, Seoul, Korea.

* cited by examiner

*Primary Examiner*—Hoang Nguyen
(74) *Attorney, Agent, or Firm*—F. Lindsey Scott; John L. Wood

(57) ABSTRACT

A system and method for the production of liquefied light hydrocarbon gases by a system and a process that produces a liquefied gas product more efficiently and with reduced emissions of carbon dioxide ($CO_2$) to the atmosphere.

22 Claims, 1 Drawing Sheet

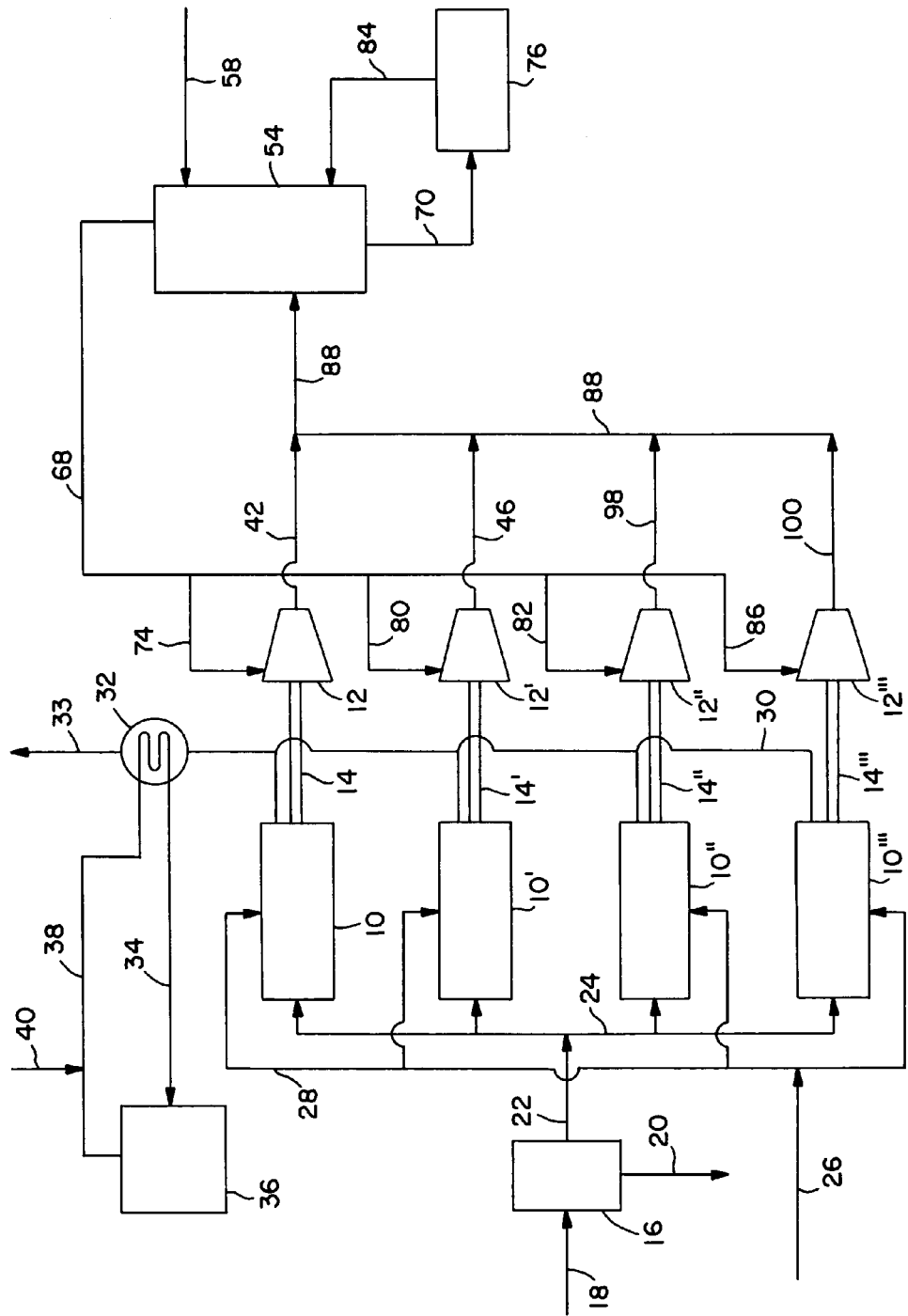

REDUCED CARBON DIOXIDE EMISSION SYSTEM AND METHOD FOR PROVIDING POWER FOR REFRIGERANT COMPRESSION AND ELECTRICAL POWER FOR A LIGHT HYDROCARBON GAS LIQUEFACTION PROCESS USING COOLED AIR INJECTION TO THE TURBINES

RELATED CASES

This application is entitled to and hereby claims the benefit of the filing date of U.S. Provisional Application No. 60/414,806 filed Sep. 30, 2002.

FIELD OF THE INVENTION

This invention relates to the production of liquefied light hydrocarbon gases by a system and a process that produces a liquefied gas product more efficiently and with reduced emissions of carbon dioxide ($CO_2$) to the atmosphere.

BACKGROUND OF THE INVENTION

In recent years, there has been continuing interest in liquefying natural gas and other light hydrocarbon gases at remote sites where there is little or no nearby market for the natural gas. Natural gas located at such remote sites is of market value only if it can be pipelined or otherwise transported to a marketplace. In many instances, it is not feasible to construct pipelines to transport such natural gas. Therefore, in many instances it has been found desirable to liquefy the natural gas on site so that it can be transported by tanker to markets.

A variety of processes for liquefying natural gas are known. In most of these processes, the natural gas is treated to remove acid gases and otherwise treated to remove water and hydrocarbons heavier than about $C_3$ as necessary prior to liquefaction. Known natural gas refrigeration processes comprise processes that may use multiple pure component refrigerants, multi-component refrigerants or combinations thereof Refrigeration processes using one or more refrigerant sections and the like may be used. A variety of such processes are known and could be used with the present invention. All such processes generally require that a compressed refrigerant be made available at a pressure such that upon cooling it can be liquefied and thereafter vaporized to produce the refrigeration required to liquefy the natural gas.

Most such processes are quite energy intensive and require substantial energy input to compress the refrigerant for repeated cycling through a refrigeration zone to produce the refrigeration necessary to at least partially liquefy the natural gas and the like. Further, substantial energy may be required in many instances to recompress the natural gas after treatment to remove acid gases or water from the natural gas or to remove heavier hydrocarbons from the natural gas. All these processes typically require large quantities of electrical power and mechanical energy with the resultant emission of large quantities of carbon dioxide ($CO_2$) into the atmosphere.

Recently it has been considered that release of $CO_2$ into the atmosphere is detrimental to the atmosphere. Accordingly, it has been deemed desirable that the amount of $CO_2$ emitted in such processes should be reduced. Typically such processes have been operated in areas where there was an abundance of cheap fuel. Therefore, little concern has been directed to limiting the emission of $CO_2$ into the atmosphere since it was more convenient and economical to simply discharge combustion exhaust streams into the atmosphere than to limit the amount of fuel consumed since such fuel is readily available at little or no cost at the liquefaction site. As well known to those skilled in the art, hydrocarbon fuels, especially light hydrocarbon gases, have been used widely for generation of electrical power and for production of mechanical energy via light hydrocarbon gas fired turbines and the like.

Recently, it has become apparent that it would be desirable to provide a system and a process for providing compressed refrigerant and electrical power for a light hydrocarbon gas liquefaction process wherein reduced emissions of $CO_2$ were produced and wherein the mechanical energy and electrical power for the process could be produced on site.

In many instances, especially with aeroderivative turbines such as General Electric Company turbine models PGT16/LM1600, PGT25/LM2500, LM6000 and PGT225+/LM2500+HSPT, power losses as high as 15 percent can occur as a result of ambient air variations in temperature, humidity and the like. This large power loss dramatically reduces the quantity of light hydrocarbon gas that can be produced in a light hydrocarbon gas liquefaction process. Continued efforts have been directed to the development of systems and methods to avoid this power loss.

SUMMARY OF THE INVENTION

According to the present invention, a reduced carbon dioxide emissions method for providing power for refrigerant compression and shared electrical power for a light hydrocarbon gas liquefaction process comprises: a) cooling an air stream to a temperature below about 20° C. to produce a cooled air stream; b) supplying at least a portion of the cooled inlet air stream to a plurality of light hydrocarbon gas-fired turbines; c) compressing a refrigerant in a plurality of compressors driven by the plurality of light hydrocarbon gas-fired turbines fueled by the cooled inlet air stream and a fuel gas stream with the turbines producing an exhaust stream at an elevated temperature; d) producing steam at an elevated temperature and pressure by heat exchange with the exhaust stream; e) driving a steam turbine with the steam from d) to produce mechanical power; and f) driving an electrical power generator with the mechanical power from e) to produce electrical power for use in the light hydrocarbon gas liquefaction process.

The invention further comprises a reduced carbon dioxide emissions system for providing power for refrigerant compression and shared electrical power for a light hydrocarbon gas liquefaction process, the system comprising: a) an air cooler having an air inlet and at least one cooled air outlet; b) a plurality of liquid hydrocarbon gas-fired turbines, each comprising an air compressor having a cooled air inlet in fluid communication with a cooled air outlet from the air cooler and a compressed air outlet in fluid communication with a combustion zone having a fuel inlet and a high-temperature, high-pressure combustion gas outlet in fluid communication with a combustion gas inlet to the turbine to drive the turbine, the turbine having a reduced pressure, high-temperature exhaust gas outlet; c) a refrigerant compressor driven by the turbine, having a low-pressure refrigerant inlet and an increased pressure refrigerant outlet with the refrigerant compressor being shaft coupled to a turbine; d) a heat exchanger having a water or low-pressure steam inlet and a steam outlet and a high-temperature, reduced pressure exhaust gas inlet in fluid communication with the reduced pressure, high-temperature exhaust gas outlet and a reduced pressure reduced temperature exhaust gas outlet so that the reduced pressure high-temperature exhaust gas passes in heat exchange relation with the water or low-pressure steam to produce steam and a reduced pressure, reduced temperature exhaust stream; e) a steam turbine in fluid communication with the steam outlet of the heat exchanger; f) an electrical power generator which is shaft coupled to the steam turbine such that mechanical power produced by the steam turbine is used to drive the electrical power generator and produce electrical power; and g) a line in fluid communication with the increased pressure refrigerant outlet and the light hydrocarbon gas liquefaction process.

BRIEF DESCRIPTION OF THE FIGURE

In the discussion of the FIGURE, the same numbers will be used throughout to refer to the same or similar components. Further many pumps, valves, and other equipment known to those skilled in the art may be required to achieve the flow indicated but have not been shown for simplicity.

DESCRIPTION OF PREFERRED EMBODIMENTS

In the FIGURE, turbines 10, 10', 10" and 10''' are shown positioned to supply mechanical power to drive refrigerant compressors 12, 12', 12" and 12''', employed to supply compressed refrigerant to a liquefaction process. The turbines are connected by shafts 14, 14', 14" and 14''' to refrigerant compressors 12, 12', 12" and 12''', which compressors may be axial, centrifugal, a combination of axial or centrifugal compressors, or the like. As shown, the turbines should be understood to include not only the turbine but also an axial compressor, centrifugal compressor or the like as required to supply compressed air (typically at a pressure from about 350 to about 800 psia) to the turbine. The turbines may also be shaft coupled to helper/starter electric motors which may be used to start or to start and drive the turbines. The turbines are powered by a hot combustion gas comprising high-pressure air introduced into the turbines by a line 22 and distribution lines 24. Line 22 should be understood to include valves, as necessary, to regulate flow into each of the turbines or to shut off flow to any or all of the turbines. The air in line 22 is supplied from a refrigeration unit 16 that cools an inlet air stream 18 to a desired temperature. Preferably the air is cooled to a temperature lower than about 20° C. and preferably from about 8 to about 15° C. and more preferably about 10° C. At this temperature water may be condensed from the air and it is shown as being discharged through a line 20. Cooling unit 16 may be propane cooler, a water/glycol system cooler or it may be any other type of suitable unit known to the art for cooling air generally, such as a cooling unit that employs any environmentally acceptable coolant media. The unit may also cool the air using a coolant obtained from the liquefaction process for the liquefied gas if desired.

Desirably a natural gas or other light hydrocarbon gas stream is supplied as fuel for the turbines through a line 26 at a suitable pressure (about 350 to about 800 psia) for combination with the air in a combustion zone to produce a hot combustion gas at an elevated temperature and pressure (typically at a temperature from about 2800 to about 3000° F. and a pressure from about 350 to about 800 psi) for use to drive the turbines. Line 28 should be considered to include valves, as necessary (not shown), to regulate the flow to any or all of the turbines. The turbines, when fueled and operated, drive refrigerant compressors 12, 12', 12" and 12''' to produce compressed refrigerant. The compressed refrigerant is typically produced from the refrigerant compressors (at a pressure from about 1 to about 75 bara) through lines 42, 46, 98 and 100 respectively. The refrigerant compressed in individual refrigerant compressors may be compressed to different pressures in different quantities and may be a different refrigerant. These variations have not been shown in the FIGURE but are considered to be readily implemented if desired by those skilled in the art. The refrigerant may be passed to liquefaction plant facilities 54 at a single or at different points and at different pressures. As shown, gaseous spent refrigerant is recovered through a line 68 and passed back to the refrigerant compressors through lines 74, 80, 82 and 86 respectively. While four refrigerant compressors are shown, it is noted that fewer or more could be used.

The particular type of refrigeration process used is not considered to be part of the present invention. Compressed refrigerant is typically required in all natural gas liquefaction processes in large quantities. In most of these processes, the refrigerant may comprise multiple pure component refrigerants, multi-component refrigerants and combinations thereof. The processes may use a single liquefaction zone, multiple liquefaction zones or variations thereof. The particular process chosen is not considered to constitute a part of the present invention.

The recovered spent refrigerant is shown as passing back to the refrigerant compressors through a line 68 for distribution from lines 74, 80, 82 and 86 or to any or all of refrigerant compressors 12, 12', 12" and 12'''. It will be appreciated by those skilled in the art that a variety of arrangements for handling the refrigerant are possible and obvious, dependent upon the type of refrigeration process practiced in the refrigeration zone or zones.

According to the present invention, improved efficiency is achieved in the compression of the refrigerant by use of the cooled inlet air to improve the efficiency in the compression section. The compression step increases the temperature of the inlet air and the temperature may impose an upper limit on the compression possible. Cooling the air prior to introducing the air into the air compression section of the turbines permits greater compression of the air thereby increasing the energy output of the turbine since the air is introduced at an initially lower temperature. Further the cooler permits the charging of the air at a near constant temperature. This air when combusted with the fuel produces a hot, high-pressure, high-temperature gas used to drive the turbines. The exhaust gases discharged from the turbines are high-temperature, low-pressure exhaust gases. The discharge of these gases is shown through line 30. The gases are passed through a heat exchanger section 32 where conventional heat exchange methods may be used to recover heat from the exhaust gas stream. The cooled exhaust gas stream (at a temperature below about 180° F.) may then be discharged as desired through a line 33 to the atmosphere or the like. Low temperature steam or water is used as a heat exchange medium in heat exchanger 32 to produce high-pressure steam (typically at a pressure from about 400 to about 1200 psi) which is recovered through a line 34 and passed to an electrical generator 36. In the electrical generator 36 high-pressure steam is used to drive a turbine or the like to generate electrical power, which is placed on the grid for operation of the light hydrocarbon gas liquefaction process. The discharged stream recovered through line 38 is typically either water that has been previously treated for use to produce steam or low-temperature, low-pressure steam.

Make up water may be added as desired through line a 40 with the mixture of water and steam and the like being recycled to heat exchanger 32.

By the process of the present invention, improved efficiency is accomplished by using cooler air at a controlled temperature as the inlet air to the turbine/air compressor system. This permits the compression of larger molecular quantities of air within the maximum temperature allowable for the air compressors. Both the air compressors and the refrigerant compressors are typically axial compressors, centrifugal compressors or the like as known to those skilled in the art.

By the practice of the present invention, not only is the efficiency of the turbines improved but also the generation of electrical power from the exhaust gases results in the production of electrical power, which is produced without the combustion of additional fossil fuel. As a result, $CO_2$ emissions from light hydrocarbon gas liquefaction processes as disclosed are up to as much as sixty percent less than with similar processes wherein the exhaust gases from the turbine are simply exhausted without heat recovery and wherein electricity generated by the combustion of fossil fuels is used as the primary source of electricity for the operation of the liquefaction process. In accordance with the present invention, the reduction in $CO_2$ emissions may be up to 60 percent. Typically the reduction is at least about 35 percent, and is desirably from about 40 to about 60 percent.

The process operation has been described with the description of the system above. It is noted however that the most commonly liquefied light hydrocarbon gas is natural gas. It is also noted that, as well known to those skilled in the art, typically the natural gas is treated prior to liquefaction for the removal of at least a major portion of the acid gas compounds, removal of water as necessary and for the removal of $C_3+$ hydrocarbon gases. The removal of the heavier gases is desirable for a variety of reasons. First these gases may be of more value as products than as part of the liquefied natural gas stream. Further, these heavier hydrocarbon gases can cause problems by condensing in undesirable locations during the liquefaction process. Further the presence of such heavier hydrocarbons may increase the BTU value of the pipeline gas resulting from liquefaction of the natural gas beyond normal specifications. This can require the undesirable step of dilution with nitrogen or other inert gases.

As also noted previously the present invention is considered to be useful with substantially all natural gas liquefaction processes that require compressed refrigerant and electrical power. As shown in the FIGURE, LNG is recovered from facilities 54 via a line 70 and passed to LNG storage and export facilities 76. A boil-off gas stream 84 is passed from facilities 76 to facility 54. As noted above the turbines may be used to produce compressed refrigerant of the same or a different type. They also may be used to produce compressed refrigerants at different pressures and volumes. Further while four turbines are shown, it should be understood that more or fewer could be used.

A major advantage of the present invention is that air-cooling unit 16 is a stand-alone unit. This unit as shown is used to service four turbine and compressor systems. Additional systems could be serviced as well by a properly sized cooling unit. It is less economical to provide such a unit to supply cooled air to a single turbine or turbine/air compressor but it is economically advantageous to provide such a unit when it can be used to provide cooled air to a plurality of turbine units. As well known to those skilled in the art, when natural gas liquefaction processes are expanded they are typically expanded as units. In other words, additional liquefaction zones are added with additional compressors and turbines to increase the capacity of the overall process. With proper sizing, air-cooling unit 16 can provide cooled air to a large number of turbine/air compressor units. This results in substantially increased efficiency in each of the units and the operation of air cooler 16 is a relatively minor expense when distributed over the operation of the large number of turbines. The larger the number of turbines serviced by air cooler 16, the greater the economic benefits from using a single air cooler to provide the cooled air to all the units.

By further combining this process with the recovery of electrical power from the hot exhaust gas, greatly improved efficiency in the overall process is achieved.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A reduced carbon dioxide emissions method for providing power for refrigerant compression and shared electrical power for a light hydrocarbon gas liquefaction process, the method comprising:
   a) cooling an air stream in a stand-alone cooler to a temperature below about 20° C. to produce a cooled air stream;
   b) supplying a cooled inlet air stream to at least one light hydrocarbon gas-fired turbine;
   c) compressing a refrigerant in a plurality of compressors driven by a plurality of light hydrocarbon gas-fired turbines fueled by the cooled inlet air stream and a fuel gas stream with the turbines producing an exhaust stream at an elevated temperature;
   d) producing steam at an elevated temperature and pressure by heat exchange with the exhaust stream;
   e) driving a steam turbine with the steam from d) to produce mechanical power; and,
   f) driving an electrical power generator with the mechanical power from e) to produce electrical power for use in the light hydrocarbon gas liquefaction process.

2. The method of claim 1 wherein the air stream is cooled by the stand-alone cooler for at least a major portion of the plurality of light hydrocarbon gas-fired turbines.

3. The method of claim 1 wherein the air is cooled to a temperature from about 8 to about 15° C.

4. The method of claim 1 wherein the stand-alone cooler cools the air by heat exchange with a fluid or surface which are operated independently from the light hydrocarbon gas liquefaction process and the light hydrocarbon gas liquefaction process refrigerant.

5. The method of claim 1 wherein the cooled inlet air is compressed and combined with a fuel gas for combustion to fuel the plurality of turbines.

6. The method of claim 1 wherein carbon dioxide emissions from the light hydrocarbon gas liquefaction process are reduced by up to about sixty percent by comparison to a comparable process wherein no air cooling is used, no heat recovery from the exhaust gas stream is used and electrical power produced by fossil fuel combustion is used as the primary source of electrical power for the light hydrocarbon gas liquefaction process.

7. The method of claim 1 wherein the light hydrocarbon gas is natural gas.

8. The method of claim 7 wherein at least a portion of hydrocarbon gases about $C_3$ and at least a portion of acid gases are removed from the natural gas.

9. The method of claim 1 wherein the stand-alone cooler is a propane cooler or a water/glycol cooler.

10. A reduced carbon dioxide emissions method for providing compressed refrigerant compression and shared electrical power to a light hydrocarbon gas liquefaction process, the method consisting essentially of:
  a) cooling an air stream to a temperature below about 20° C. in a stand-alone cooler to produce a cooled air stream;
  b) supplying the cooled air stream to a plurality of light hydrocarbon gas-fired turbines;
  c) compressing a refrigerant in a plurality of compressors driven by a plurality of light hydrocarbon gas-fired turbines fueled by the cooled inlet air stream and a fuel gas stream with the turbine producing an exhaust stream at an elevated temperature;
  d) producing steam at an elevated temperature and pressure by heat exchange with the exhaust stream;
  e) driving a steam turbine with the steam from d) to produce mechanical power; and,
  f) driving an electrical power generator with the mechanical power from e) to produce electrical power for use in the light hydrocarbon gas liquefaction process.

11. A reduced carbon dioxide emissions system for providing power for refrigerant compression and shared electrical power for a light hydrocarbon gas liquefaction process, the system comprising:
  a) a stand-alone air cooler having an air inlet and at least one cooled air outlet;
  b) a light hydrocarbon gas-fired turbine comprising an air compressor having an air inlet in fluid communication with a cooled air outlet from the air cooler and a compressed air outlet in fluid communication with a combustion zone having a fuel inlet and a high-temperature, high-pressure combustion gas outlet in fluid communication with a combustion gas inlet to the turbine to drive the turbine, the turbine having a reduced pressure, high-temperature exhaust gas outlet;
  c) a refrigerant compressor driven by the turbine and having a low-pressure refrigerant inlet and an increased pressure refrigerant outlet with the compressor being shaft coupled to the turbine;
  d) a heat exchanger having a water or low-pressure steam inlet and a steam outlet and a high-temperature reduced pressure exhaust gas inlet in fluid communication with the reduced pressure, high-temperature exhaust gas outlet and a reduced pressure, reduced temperature exhaust gas outlet so that the reduced pressure, high-temperature exhaust gas passes in heat exchange with the water or low-pressure steam to produce high-pressure steam and a reduced pressure, reduced temperature exhaust stream;
  e) a steam turbine in fluid communication with the steam outlet of the heat exchanger;
  f) an electrical power generator which is shaft coupled to the steam turbine such that mechanical power produced by the steam turbine is used to drive the electrical power generator and produce electrical power; and,
  g) a line in fluid communication with the increased pressure refrigerant outlet and the light hydrocarbon gas liquefaction process.

12. The system of claim 11 wherein the air compressor is an axial air compressor or a centrifugal air compressor.

13. The system of claim 12 wherein the air compressor is a multi-stage axial compressor or a multi-stage centrifugal air compressor.

14. The system of claim 11 wherein carbon dioxide emissions from the light hydrocarbon gas liquefaction process are reduced by up to about sixty percent by comparison to a comparable process wherein no air cooling is used, the exhaust gas stream is discharged or used for other purposes and electricity produced by fossil fuel combustion is used as the primary source of electricity for the light hydrocarbon gas liquefaction process.

15. The system of claim 11 wherein the air cooler is a propane or a water/glycol air cooler.

16. The system of claim 11 wherein each of a plurality of turbines are in fluid communication with a cooled air outlet from the air cooler.

17. The system of claim 11 wherein the water or low-pressure steam and reduced pressure, high-temperature exhaust gas are passed in counter current heat exchange.

18. The system of claim 11 wherein low-pressure refrigerant is passed from the light hydrocarbon gas liquefaction process to the low-pressure refrigerant inlet.

19. The system of claim 18 wherein the electrical power is passed to the electrical supply grid for the light hydrocarbon gas liquefaction process.

20. The system of claim 11 wherein the turbines may produce compressed refrigerant at different selected pressures.

21. A reduced carbon dioxide emissions method for providing power for refrigerant compression and shared electrical power for a light hydrocarbon gas liquefaction process, the method comprising:
  a) cooling an air stream in a stand-alone cooler to a temperature below about 20° C. to produce a cooled air stream;
  b) supplying a cooled inlet air stream to a plurality of light hydrocarbon gas-fired turbines;
  c) compressing a refrigerant in a plurality of compressors driven by a plurality of light hydrocarbon gas-fired turbines fueled by the cooled inlet air stream and a fuel gas stream with the turbines producing an exhaust stream at an elevated temperature;
  d) producing steam at an elevated temperature and pressure by heat exchange with the exhaust stream;
  e) driving a steam turbine with the steam from d) to produce mechanical power; and,
  f) driving an electrical power generator with the mechanical power from e) to produce electrical power for use in the light hydrocarbon gas liquefaction process.

22. A reduced carbon dioxide emissions system for providing power for refrigerant compression and shared electrical power for a light hydrocarbon gas liquefaction process, the system comprising:
  a) a stand-alone air cooler having an air inlet and at least one cooled air outlet;
  b) a plurality of light hydrocarbon gas-fired turbines, each comprising an air compressor having an air inlet in fluid communication with a cooled air outlet from the air cooler and a compressed air outlet in fluid communication with a combustion zone having a fuel inlet and a high-temperature, high-pressure combustion gas outlet in fluid communication with a combustion gas inlet to the turbine to drive the turbine, the turbine having a reduced pressure, high-temperature exhaust gas outlet;

c) a refrigerant compressor driven by the turbine and having a low-pressure refrigerant inlet and an increased pressure refrigerant outlet with the compressor being shaft coupled to the turbine;

d) a heat exchanger having a water or low-pressure steam inlet and a steam outlet and a high-temperature reduced pressure exhaust gas inlet in fluid communication with the reduced pressure, high-temperature exhaust gas outlet and a reduced pressure, reduced temperature exhaust gas outlet so that the reduced pressure, high-temperature exhaust gas passes in heat exchange with the water or low-pressure steam to produce high-pressure steam and a reduced pressure, reduced temperature exhaust stream;

e) a steam turbine in fluid communication with the steam outlet of the heat exchanger;

f) an electrical power generator which is shaft coupled to the steam turbine such that mechanical power produced by the steam turbine is used to drive the electrical power generator and produce electrical power; and, g) a line in fluid communication with the increased pressure refrigerant outlet and the light hydrocarbon gas liquefaction process.

* * * * *